United States Patent [19]
Williams et al.

[11] Patent Number: 5,170,674
[45] Date of Patent: * Dec. 15, 1992

[54] TRANSFER CASE POWER TAKE-OFF APPARATUS

[75] Inventors: Randolph C. Williams, Weedsport; Robert J. Wilson, Warners, both of N.Y.

[73] Assignee: New Venture Gear, Inc., Troy, Mich.

[ * ] Notice: The portion of the term of this patent subsequent to Mar. 31, 2009 has been disclaimed.

[21] Appl. No.: 822,037

[22] Filed: Jan. 15, 1992

Related U.S. Application Data

[63] Continuation of Ser. No. 687,837, Apr. 19, 1991, Pat. No. 5,099,704.

[51] Int. Cl.⁵ .............................................. F16H 37/06
[52] U.S. Cl. .................................. 74/15.88; 74/15.84; 74/15.4; 475/346; 475/335
[58] Field of Search .................. 74/15.4, 15.88, 15.84; 475/296, 331, 335, 346

[56] References Cited

U.S. PATENT DOCUMENTS

| | | | |
|---|---|---|---|
| 1,903,013 | 3/1933 | Salerni | 475/335 X |
| 4,092,878 | 6/1978 | Campbell | 475/346 X |
| 4,604,908 | 8/1986 | Dolan | 74/15.88 |
| 4,813,290 | 3/1989 | Hone | 74/15.88 |
| 4,862,755 | 9/1989 | Eastman et al. | 74/15.88 |
| 5,099,704 | 3/1992 | Williams et al. | 74/15.88 |

Primary Examiner—Leslie A. Braun
Assistant Examiner—Julie Krolikowski
Attorney, Agent, or Firm—Harness, Dickey & Pierce

[57] ABSTRACT

An improved power take-off arrangement for a transfer case which is readily incorporated into a planetary gear reduction assembly without necessitating excessive redesign of the transfer case. The power take-off arrangement includes utilization of a bearing support member for eliminating excessive eccentric loading during power take-off operation while providing improved centering and piloting capabilities.

25 Claims, 2 Drawing Sheets

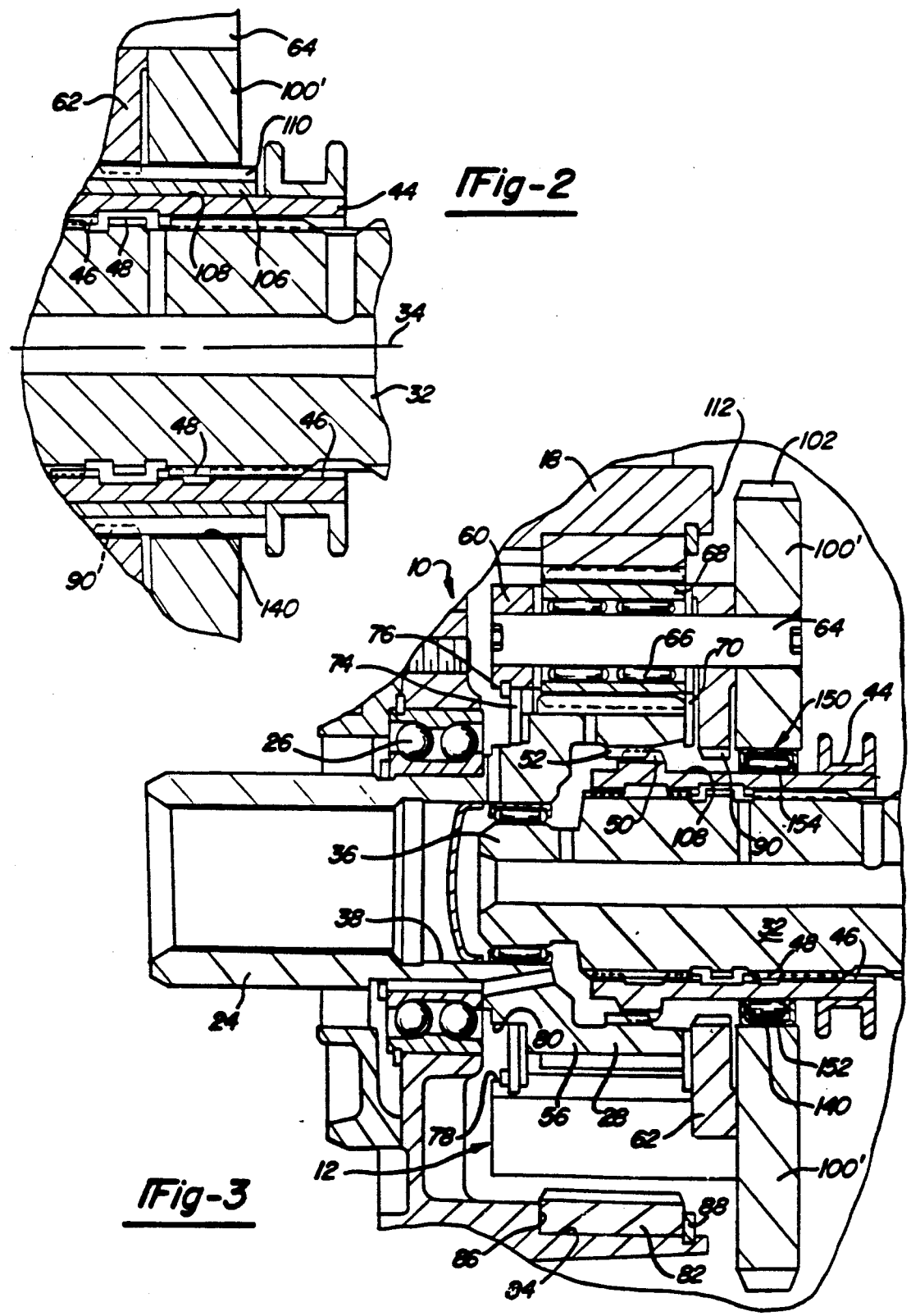

TRANSFER CASE POWER TAKE-OFF APPARATUS

This is a continuation of U.S. patent application Ser. No. 07/687,837 filed Apr. 19, 1991, now U.S. Pat. No. 5,099,704.

BACKGROUND OF THE INVENTION

The present invention relates to a transfer case of four wheel drive vehicles and, more particularly, to a power take-off arrangement for a planetary gear reduction assembly supported within the transfer case.

It is a desirable option to provide a power take-off arrangement for a transfer case which is readily accessible and compact. Conventionally, it had been the practice to mount a separate power take-off gear on the input shaft of the transfer case for delivering torque from the input shaft to a power take-off gearbox. However, such arrangements typically require extensive redesign of the existing transfer case including extending the input shaft and transfer case housing to accommodate the power take-off gear. Unfortunately, space limitations generally make such design adjustments impractical or financially prohibitive.

As disclosed in U.S. Pat. No. 4,604,908 issued Aug. 12, 1986 to Dolan and commonly assigned to the present assignee of the instant application, a power take-off arrangement is provided in association with a planetary gear reduction assembly. In general, the power take-off gearbox is driven by the planetary gear assembly at a reduced speed relative to the input shaft. More specifically, the transfer case housing supports an annulus gear and the input shaft which terminates in an axial flange portion defining an integral sun gear. A rotatably carrier assembly supports a plurality of planet gears and includes an inboard carrier ring having peripheral gear teeth adapted to mesh with an input gear of the power take-off gearbox. While, the power take-off arrangement disclosed in U.S. Pat. No. 4,604,908 preforms satisfactory, by virtue of its construction the loading imposed by the power take-off input gear on the inboard carrier ring caused eccentric loading to be transferred to the planetary gear reduction assembly. As such, a bending moment is exerted on the planetary gear reduction assembly which may result in excessive gear wear, binding, and/or over-stressed conditions during operation of the transfer case in its power take-off mode.

SUMMARY OF THE INVENTION

It is an object of the present invention to provide an improved power take-off arrangement for a transfer case which is readily incorporated into a planetary gear reduction assembly without necessitating excessive redesign of the transfer case. The power take-off arrangement of the present invention includes utilization of bearing support means for eliminating excessive eccentric loading during power take-off operation while providing improved centering and piloting capabilities.

It is another object of this invention to provide a transfer case of the type which uses the rotatable carrier assembly of the planetary gear reduction assembly to drive the power take-off output gear. This arrangement advantageously utilizes the continuously rotated planetary carrier assembly for driving the power take-off output gear when the transfer case is operating in any of its various driving modes.

Accordingly, the improved power take-off arrangement of the present invention includes a separate power take-off output gear fixedly supported for rotation with the carrier assembly of the helical planetary gear reduction assembly. Support bearing means are concentrically interposed between a shiftable clutch collar and the central bore of the take-off output gear. The bearing support means journally supports the power take-off output gear for rotation about a central longitudinal axis. This arrangement inhibits excessive unbalanced radial loading on the carrier assembly for obviating excessive gear wear when drive torque is transfer to the power take-off gearbox.

The transfer case clutch collar may be shifted in one direction from a neutral position into a "high" or direct drive range position wherein it interconnects the input shaft sun gear directly to the central output shaft. Upon returning the clutch collar to its neutral position, the input shaft sun gear is uncoupled from the central output shaft. Shifting of the clutch collar in the opposite direction from the neutral position defines a "low" drive range position wherein the clutch collar external splines engage internal splines formed on the central bore of the inboard carrier ring. Thus, with the clutch collar in any of its three positions, (i.e. high, neutral or low) a power take-off mode may be achieved by placing the input gear associated with the power take-off gearbox unit in driving engagement with the power take-off output gear. As a result, power at a predetermined constant relative speed is transferred from the input shaft sun gear to the helical planetary gear reduction assembly and, in turn, to the power take-off output gear.

Other objects, features, and advantages of the present invention will be readily apparent from a thorough study of the following detailed description taken in conjunction with the accompanying drawings and appended claims.

BRIEF DESCRIPTION OF THE DRAWINGS

FIG. 2 is a partial cross-sectional view of a power take-off arrangement incorporated with the planetary gear reduction assembly of FIG. 1 in accordance with a second preferred embodiment of the present invention; and FIG. 3 is a fragmentary cross-sectional view, similar to FIG. 1, illustrating a power take-off arrangement according to a third preferred embodiment of the present invention.

DESCRIPTION OF THE PREFERRED EMBODIMENT

Figure 1:
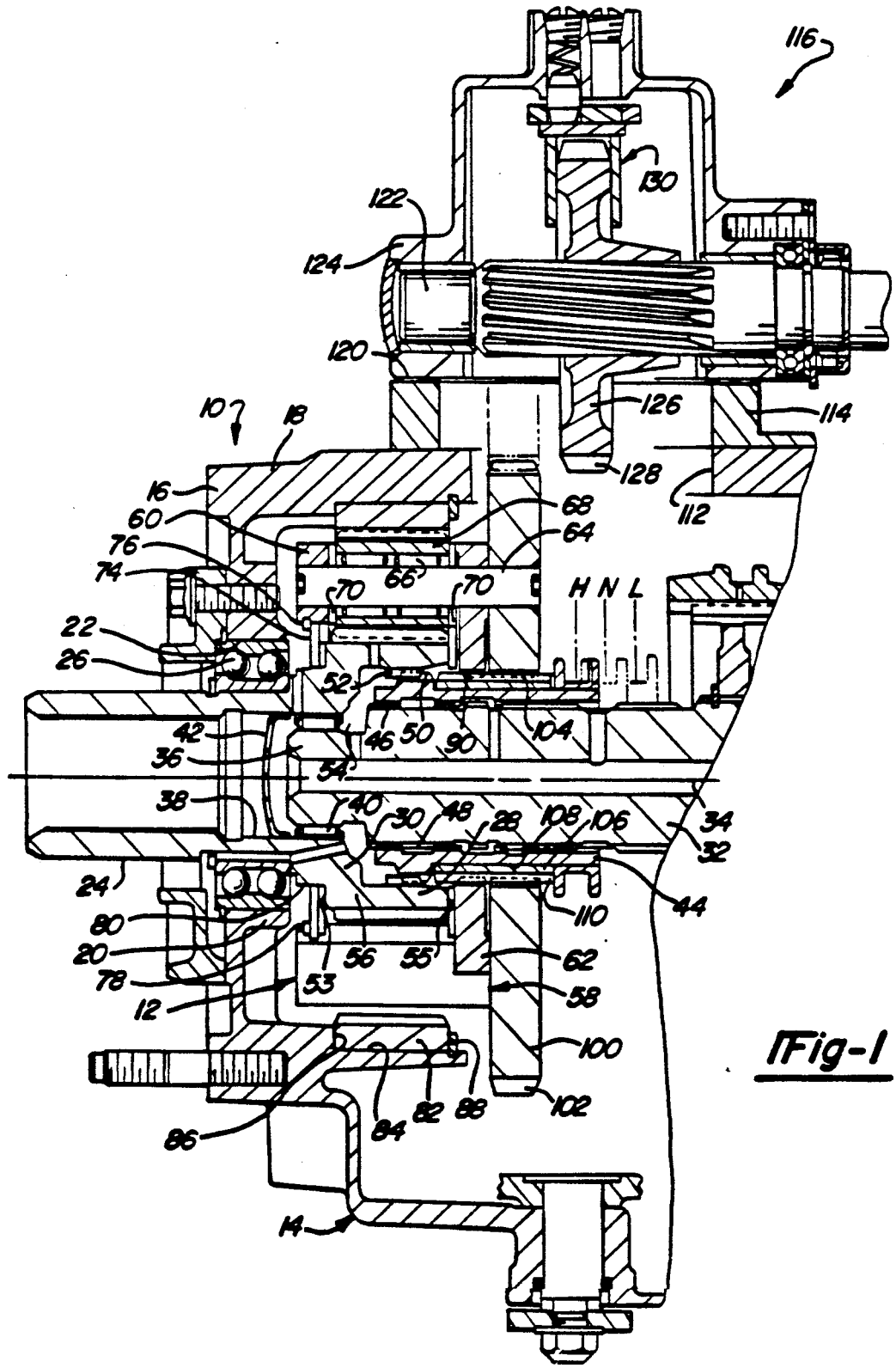
FIG. 1 is a fragmentary cross-sectional view a portion of an exemplary transfer case incorporating a power take-off arrangement with a planetary gear reduction assembly according to a first preferred embodiment of the present invention.

Referring now to the drawings, a portion of an exemplary transfer case 10 incorporating a helical planetary gear reduction assembly 12 is shown. Vehicle transfer case 10 and helical planetary gear reduction assembly 12 are thoroughly disclosed in U.S. Pat. No. 4,677,873 to Eastman, commonly assigned to the assignee of the instant application, the disclosure of which is incorporated by reference herein. However, it will be appreciated that the various power take-off arrangements described hereinafter are readily adapted for utilization with any full-time, part-time, synchronized or non-synchronized transfer case incorporating a planetary gear reduction assembly therein.

With reference to FIG. 1, a transfer case housing 14 includes an end wall 16 with a side wall 18 extending therefrom in one axial direction. End wall 16 has an annular hub portion 20 formed therein having an axial bore 22 journally supporting an input shaft 24 therein by a bearing assembly 26. Input shaft 24 terminates in an outwardly stepped axially extending flange portion 28 joined by an intermediate stepped radially extending flange portion 30 to input shaft 24. An output shaft 32 is aligned on a central longitudinal axis 34 of input shaft 24 and has a piloted end 36 received in an input shaft bore 38 by needle bearings 40. An end plug 42 closes shaft bore 38. Output shaft 32 has a clutch collar 44 axially slidable thereon by means of collar internal splines 46 engaged with output shaft external splines 48.

Clutch collar 44 has external clutch teeth 50 shown slidably engaged with internal clutch teeth 52 in an axial counter-bore 54 formed in flange portion 28 of input shaft 24. Torque is transferred directly from input shaft 24 to output shaft 32 via engagement of clutch teeth 50 and 52 and collar internal splines 46 with output shaft external splines 48 for establishing a direct high-range drive mode "H".

With continued reference to FIG. 1, input shaft axial flange portion 28 is shown to define an integral helical sun gear 56 of planetary gear reduction assembly 12. More particularly, sun gear 56 defines oppositely facing radially extending annular shoulders 53 and 55. Planetary gear reduction assembly 12 includes a carrier assembly 58 having first outboard and second inboard carrier ring members 60 and 62, respectively. The axially spaced ring members are fixedly joined by a plurality of circumferentially spaced pins that form axially extending pinion shafts 64. Journalled on needle bearing 66 for rotation on shafts 60 are a plurality of helical planet or pinion gears 68. Thrust washers 70 are provided on shafts 64 intermediate pinion gears 68 and each of carrier ring members 60 and 62 for axially aligning pinion gears 68. Thrust washers 70 contact the respective inner surfaces of carrier rings 60 and 62 and transverse shoulders 53 and 55, respectively, to axially locate and align carrier assembly 58. A locking ring 74 and snap retainer 76 are disposed between an interior bearing surface 78 formed on carrier outboard ring 60 and exterior bearing surface 80 formed on radial flange portion 30. Thus, rotatable movement of first carrier ring 60 relative to input shaft bearing surface 80 inhibits axial and excessive radial movement of pinion gears 68 for optimum tooth bearing engagement with annulus gear 82 and sun gear 56.

Helical annulus gear 82 is mounted via a splined press-fit on an inner surface of housing cylindrical side wall 18. In the embodiments shown, side wall 18 includes a stepped counterbore 84 which receives and axially seats in a press-fit manner annulus gear 82 against its stop shoulder 86. Annulus gear 82 is additionally retained against inward axial movement away from stop shoulder 86 in the disclosed form by means of a retaining ring 88 fixed to housing 16 by machine screws (not shown). Alternatively, it is contemplated that in another form, a snap-ring could be used to insure positive retention of annulus gear 82 against axial thrust loads.

Second carrier ring 62 includes internal spur gear teeth 90 formed thereon which may be placed in sliding meshing engagement with clutch collar external teeth 50 when clutch collar 44 is moved axially to the right into the low range mode position "L" indicated in dashed lines.

In accordance with the first preferred embodiment of the present invention, a power take-off output gear 100 is fixably secured (i.e. welded) to an outer surface of inboard carrier ring 62. In addition, pinion shafts 64 extend through and are fixed to take-off output gear 100. Power take-off output gear 100 has spur gear teeth 102 formed at its outer periphery and internal gear teeth 104 formed on its central bore which are generally alignable with internal gear teeth 90 of second carrier ring 62. Support bearing means are provided for concentrically supporting power take-off output gear 100 for rotation about central axis 34 while inhibiting any excessive bending moment from being exerted on planetary gear reduction assembly 12 upon transfer case 10 being operated in its power take-off mode.

The bearing support means is shown to include an elongated sleeve bearing 106 concentrically and journally supported on an exterior cylindrical surface 108 of clutch collar 44. Elongated sleeve bearing 106 includes external spline teeth 110 alignable with clutch collar external clutch teeth 50 and which are adapted to be maintained in constant meshed engagement with both internal spur gear teeth 90 of second inboard carrier ring 62 and internal gear teeth 104 of power take-off output gear 100. As such, take-off output gear 100 is rotatably driven with the constantly rotated planetary carrier assembly 58 when clutch collar 44 is selectively shifted to any of its high "H", neutral "N" and low "L" range positions.

As best seen in FIG. 1, a portion of housing side wall 18, located in close proximity to output gear 100, is adapted to be removed for providing a rectangular access opening or aperture 112 which is aligned radially outwardly from take-off output gear external gear teeth 102. Aperture 112 is defined by a suitable mounting structure such as peripheral rectangular frame 114.

An exemplary and conventional power take-off gearbox unit 116 is adapted to be securely mounted on frame structure 114 such as by a plurality of bolts (not shown). Seal means 120 are provided between frame 114 and gearbox unit 116 for providing a fluid-tight seal therebetween. Gearbox unit 116 includes a longitudinally extending take-off shaft 122 journalled in casing 124 and which is positioned parallel with transfer case input shaft 24 and output shaft 32. Take-off shaft 122 has a power take-off input gear 126 which is splined thereto for axial sliding movement thereon and rotation therewith. Input gear 126 is sized such that its gear teeth 128 extend radially through aperture 112 and are positioned to slidably mesh with output gear teeth 102. Thus, input gear 126 is adapted to be selectively shifted axially on shaft 122 between the right "disengaged" position shown, and the left "engaged" position (shown in dashed lines) by a fork mechanism 130.

With reference now to FIG. 2, a second preferred embodiment of a power take-off arrangement is shown which is adapted for incorporation with helical planetary gear reduction assembly 12. In general, this arrangement is substantially identical to that shown in FIG. 1 with the exception that internal gear teeth 104 formed on power take-off output gear 100 are removed such that the major diameter surface of sleeve bearing external spline teeth 110 supports a nonsplined surface 140 of modified take-off output gear 100'. In this manner, torque is only transferred to power take-off output gear 100 through pinion shafts 64.

With particular reference now to FIG. 3, a third preferred embodiment of a power take-off arrangement is shown as incorporated in helical planetary gear reduction assembly 12. As will be appreciated, like numbers are used to designate like components herebefore described. In general, elongated sleeve bearing 106 is replaced with a bearing assembly 150 having its outer race 152 fixedly secured to non-splined surface 140 of take-off output gear 100'. An inner race 154 of bearing assembly 150 engages cylindrical surface 108 of clutch collar 44. Bearing assembly 150 is adapted to permit sliding axial movement of clutch collar 44 while concentrically supporting rotation of output gear 100' with respect to clutch collar 44.

As will be appreciated, each of the various disclosed embodiments provides a compact power take-off arrangement incorporated with rotatable planetary carrier assembly 58. The various bearing support devices are adapted to enable the output gear teeth 102 to absorb stresses while inhibiting excessive radial "floating" of carrier assembly 58 during power take-off mode operation. By virtue of each of the improved power take-off arrangements, virtually no eccentric loading is transferred to "bend" planet pinion gear shafts 64 thereby obviating the application of any unbalanced or "tipping" forces on the intermeshed components of gear reduction assembly 12. Thus, the present invention prevents excessive gear teeth wear or stress conditions, such as tight meshing, for example, developing between planet gear 68 during operation of transfer case 10 in its power take-off mode. It will be noted that carrier assembly 58 and, in turn, second carrier ring 62 always rotate in a fixed relation with respect to input shaft 24 because of the grounded annulus arrangement and the constant meshing of planet pinions 68 with sun gear 56 and annulus gear 82. Thus, as carrier assembly 58 is always rotating, a feature of the present invention is that power may be selectively transferred to power take-off input gear 126 with transfer case 10 in any one of its three operative positions, (i.e. high range, neutral, or low range) at a predetermined speed reduction relative to input shaft 24.

What is claimed is:

1. A power take-off arrangement comprising:
   a housing;
   a first member supported for rotation from said housing;
   a sun gear fixed for rotation with said first member;
   a second member supported for rotation from said housing;
   an annulus gear fixed to said housing;
   a carrier assembly journally supporting a plurality of planet gears meshed with said sun gear and said annulus gear such that said carrier assembly rotates at a predetermined speed reduction relative to said first member;
   a clutch collar fixed for rotation on said second member and axially slidable thereon between a direct high-range drive position wherein said clutch collar is coupled to said sun gear and a reduced ratio low-range drive position wherein said clutch collar is coupled to said carrier assembly;
   a power take-off gear fixed for rotation to said carrier assembly; and
   bearing support means interposed between said clutch collar and said power take-off gear for journally supporting said power take-off gear with respect to said clutch collar.

2. The power take-off arrangement of claim 1 wherein said carrier assembly and said power take-off gear each have a central bore through which said clutch collar is slidably movable, said support bearing means comprising an elongated sleeve bearing concentrically disposed between said clutch collar and said central bores of said carrier assembly and said power take-off gear.

3. The power take-off arrangement of claim 2 wherein said elongated sleeve bearing is journally supported for rotation relative to said clutch collar when said clutch collar is in said direct high-range drive position.

4. The power take-off arrangement of claim 3 wherein said elongated sleeve bearing includes external spline means that are engageable with internal spline means formed on said central bore of said carrier assembly such that said elongated sleeve bearing is rotatably driven in response to rotation of said carrier assembly.

5. The power take-off arrangement of claim 4 wherein said power take-off gear includes internal spline means formed on its central bore and which are maintained in meshed engagement with said external spline means of said elongated sleeve bearing.

6. The power take-off arrangement of claim 4 wherein a major diameter surface of said external spline means formed on said elongated sleeve bearing is sized to radially support said power take-off gear.

7. The power take-off arrangement of claim 1 wherein said bearing support means includes a bearing assembly disposed between a central bore formed in said power take-off gear and an external surface of said clutch collar, said bearing assembly supporting said power take-off gear for rotation relative to said clutch collar while permitting axial sliding movement of said clutch collar between said high-range and low-range drive positions.

8. The power take-off arrangement of claim 1 wherein said carrier assembly includes first and second carrier rings that are laterally spaced on opposite sides of said sun gear, and wherein said planet gears are supported from elongated shafts extending between said first and second carrier rings.

9. The power take-off arrangement of claim 8 wherein said power take-off gear is fixed to said second carrier ring.

10. The power take-off arrangement of claim 1 wherein said power take-off gear has external gear teeth provided for selectively meshing with an input gear of a power take-off gearbox mounted to said housing.

11. A power take-off arrangement for a four-wheel drive transfer case comprising:
    a housing;
    an input shaft supported for rotation from said housing;
    a sun gear fixed for rotation with said input shaft;
    an output shaft supported for rotation from said housing;
    a clutch collar supported for rotation with said output shaft and axially slidable thereon in a first direction to a high-range drive postion wherein said clutch collar is coupled to one of said sun gear and said input shaft such that said output shaft is directly driven by said input shaft;
    a planetary gear reduction assembly having an annulus gear fixed to said housing and a carrier assembly supporting a plurality of planet gears therein, said planet gears being meshed with said annulus gear and said sun gear such that said carrier assembly rotates at a predetermined speed reduction relative to said input shaft, said gear reduction assembly operable for driving said output shaft at said predetermined speed reduction in response to axial sliding movement of said clutch collar in a second direction to a low-range drive position wherein said clutch collar is coupled to said carrier assembly;

a power take-off gear fixed for rotation with said carrier assembly and having a central bore concentrically surrounding said clutch collar; and bearing support means interposed between said clutch collar and said central bore of said power take-off gear for journally supporting said power take-off gear with respect to said clutch collar.

12. The power take-off arrangement of claim 11 wherein said carrier assembly and said power take-off gear each have a central bore through which said clutch collar is axially slidably movable, said support bearing means comprising an elongated sleeve bearing concentrically disposed between said clutch collar and said central bores of said carrier assembly and said power take-off gear.

13. The power take-off arrangement of claim 12 wherein said elongated sleeve bearing is journally supported for rotation relative to said clutch collar when said clutch collar is in said high-range drive position.

14. The power take-off arrangement of claim 13 wherein said elongated sleeve bearing includes external spline means that are engageable with internal spline means formed on said central bore of said carrier assembly such that said elongated sleeve bearing is rotatably driven in response to rotation of said carrier assembly.

15. The power take-off arrangement of claim 14 wherein said power take-off gear includes internal spline means formed on its central bore and which are maintained in meshed engagement with said external spline means of said elongated sleeve bearing.

16. The power take-off arrangement of claim 14 wherein a major diameter surface of said external spline means formed on said elongated sleeve bearing is sized to radially support said power take-off gear.

17. The power take-off arrangement of claim 11 wherein said bearing support means includes a bearing assembly disposed between said central bore of said power take-off gear and an external surface of said clutch collar, said bearing assembly supporting said power take-off gear for rotation relative to said clutch collar while permitting axial sliding movement of said clutch collar.

18. The power take-off arrangement of claim 11 wherein said carrier assembly includes first and second carrier rings that are laterally spaced on opposite sides of said sun gear, and wherein said planet gears are supported from elongated shafts extending between said first and second carrier rings.

19. The power take-off arrangement of claim 18 wherein said power take-off gear is fixed to said second carrier ring and said elongated shafts.

20. The power take-off arrangement of claim 11 wherein said power take-off gear has external gear teeth provided for selectively meshing with an input gear of a power take-off gearbox mounted to said housing.

21. A transfer case comprising:
a housing;
an input shaft supported for rotation from said housing and having a sun gear fixed for rotation therewith;

an output shaft supported for rotation from said housing and having a clutch collar axially slidable thereon, said clutch collar being rotatably coupled to said sun gear when said clutch collar is moved in a first direction from a neutral position to a high-range drive position;

planetary gear reduction means including a carrier assembly having first and second carrier rings and shaft means for journally supporting a plurality of planet gears between said first and second carrier rings, an annulus gear fixedly supported within said housing, said planet gears meshed with said sun gear and said annulus gear for rotating said carrier assembly at a reduced speed ratio relative to said input shaft, said clutch collar being rotatably coupled to said carrier assembly when said clutch collar is moved in a second direction from said neutral position to a low-range drive position;

a power take-off output gear fixed to said second carrier ring for rotation with said carrier assembly;

a power take-off gearbox mounted on said housing and including an input gear coupled to a take-off shaft and provided for meshingly engaging said power take-off output gear; and bearing support means concentrically interposed between said clutch collar and a central axial bore formed in said power take-off output gear for journally supporting said power take-off output gear with respect to said clutch collar, said bearing support means adapted to inhibit unbalanced eccentric loading on said planetary gear reduction means upon said transfer case operating in a power take-off mode for delivering torque from said power take-off output gear to said input gear for driving said take-off shaft.

22. The transfer case of claim 21 wherein said support bearing means is an elongated sleeve bearing concentrically disposed between said clutch collar and central bores formed in both of said second carrier ring and said power take-off output gear, said elongated sleeve bearing journally supported for rotation relative to said clutch collar when said clutch collar is in said neutral and said high-range drive positions, said elongated sleeve bearing having external spline means that are engagable with internal gear teeth formed on said axial bore of said second carrier ring such that said elongated sleeve bearing is rotatably driven in response to rotation of said carrier assembly.

23. The transfer case of claim 22 wherein said take-off output gear further comprises internal gear teeth formed on its axial bore that are maintained in meshed engagement with said external spline means of said elongated sleeve bearing.

24. The transfer case of claim 21 wherein a major diameter surface of said external spline means formed on said elongated sleeve bearing is adapted to radially support said take-off output gear.

25. The transfer case of claim 21 wherein said support bearing means includes a bearing assembly concentrically disposed between said central axial bore formed in said power take-off output gear and an external surface of said clutch collar, said bearing assembly operable to journally support said power take-off output gear with respect to said clutch collar while permitting axial sliding movement of said clutch collar relative thereto.

* * * * *